United States Patent [19]
Lee et al.

[11] Patent Number: 6,149,372
[45] Date of Patent: Nov. 21, 2000

[54] CARGO LOADER

[76] Inventors: James E. Lee, 7200 Meadow La., Davisburg, Mich. 48350; Paul D. Lacy, 23169 Glenmoor Heights, Farmington Hills, Mich. 48336

[21] Appl. No.: 08/986,135

[22] Filed: Dec. 16, 1997

Related U.S. Application Data

[60] Provisional application No. 60/033,385, Dec. 16, 1996.

[51] Int. Cl.⁷ ........................................................ B60P 1/43
[52] U.S. Cl. ........................... 414/538; 414/500; 414/522
[58] Field of Search .................................. 414/537, 538, 414/522, 500; 280/651; 14/71.1

[56] References Cited

U.S. PATENT DOCUMENTS

| | | | |
|---|---|---|---|
| 1,252,899 | 1/1918 | Greer et al. | 414/500 |
| 1,677,733 | 7/1928 | Schiftner | 414/500 X |
| 3,255,902 | 6/1966 | Welter | 414/537 |
| 3,474,922 | 10/1969 | Wood et al. | 414/500 X |
| 3,809,266 | 5/1974 | Saterni | 414/538 X |
| 4,878,800 | 11/1989 | Dell | 414/537 X |
| 4,887,836 | 12/1989 | Simjian | 280/651 |
| 4,930,799 | 6/1990 | Pihlstrom et al. | 414/500 X |
| 5,046,913 | 9/1991 | Domek et al. | 414/522 |
| 5,077,852 | 1/1992 | Karlsson | 414/537 X |
| 5,542,810 | 8/1996 | Florus | 414/538 |
| 5,556,249 | 9/1996 | Heine | 414/538 X |
| 5,730,577 | 3/1998 | Jones | 414/538 X |

FOREIGN PATENT DOCUMENTS

| | | | |
|---|---|---|---|
| 101177 | 5/1937 | Australia | 414/538 |
| 3-295730 | 12/1991 | Japan | 414/537 |

*Primary Examiner*—Steven A. Bratlie
*Attorney, Agent, or Firm*—Plunkett & Cooney, PC

[57] ABSTRACT

A device for loading cargo into the cargo bay area of mini-vans and similar vehicles comprises a frame, a winch, and a cart. The frame is disposed partially in the cargo bay area of the vehicle and extends outside the vehicle therefrom. The frame is anchored inside the vehicle by removably attaching to anchor rods in the floor of the vehicle that normally hold the rear and/or middle seats in place. The frame defines a pathway on which the cart can travel, pulled by the winch. The frame is collapsible and stowable in the vehicle. The cart comprises a base, a collapsible handle, and, optionally, an extensible ramp, enabling use of the cargo loader with a motorized personal vehicle such as is used by disabled persons. The winch is powered, optionally, both by a motor and manually.

14 Claims, 14 Drawing Sheets

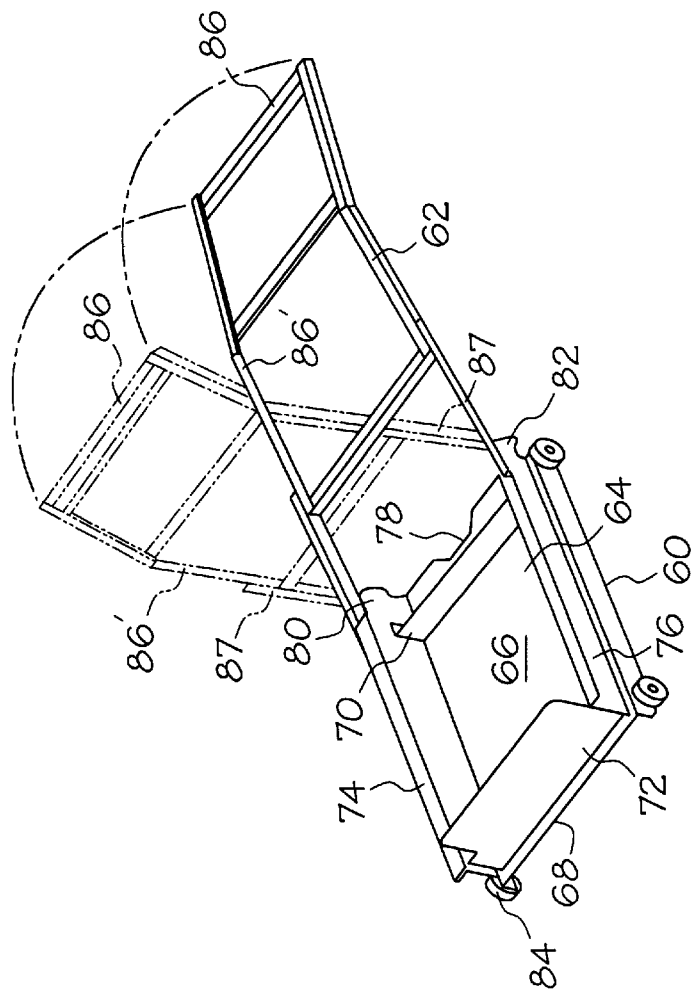
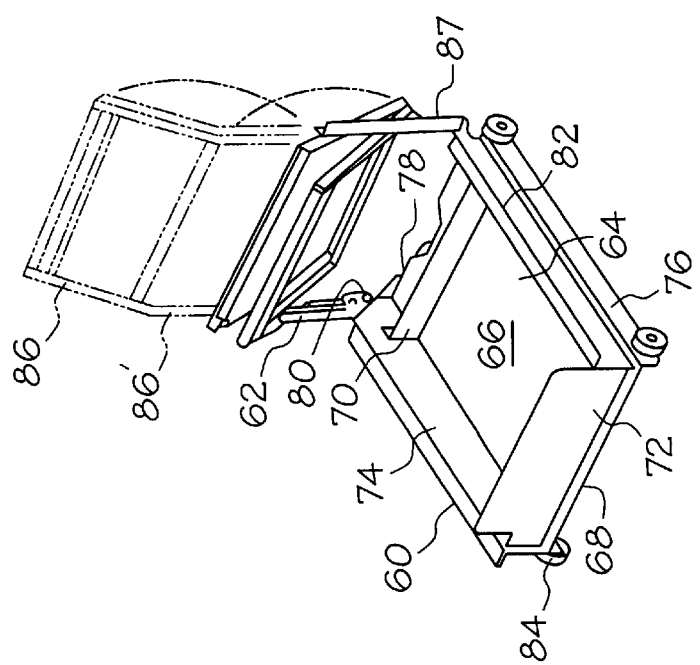

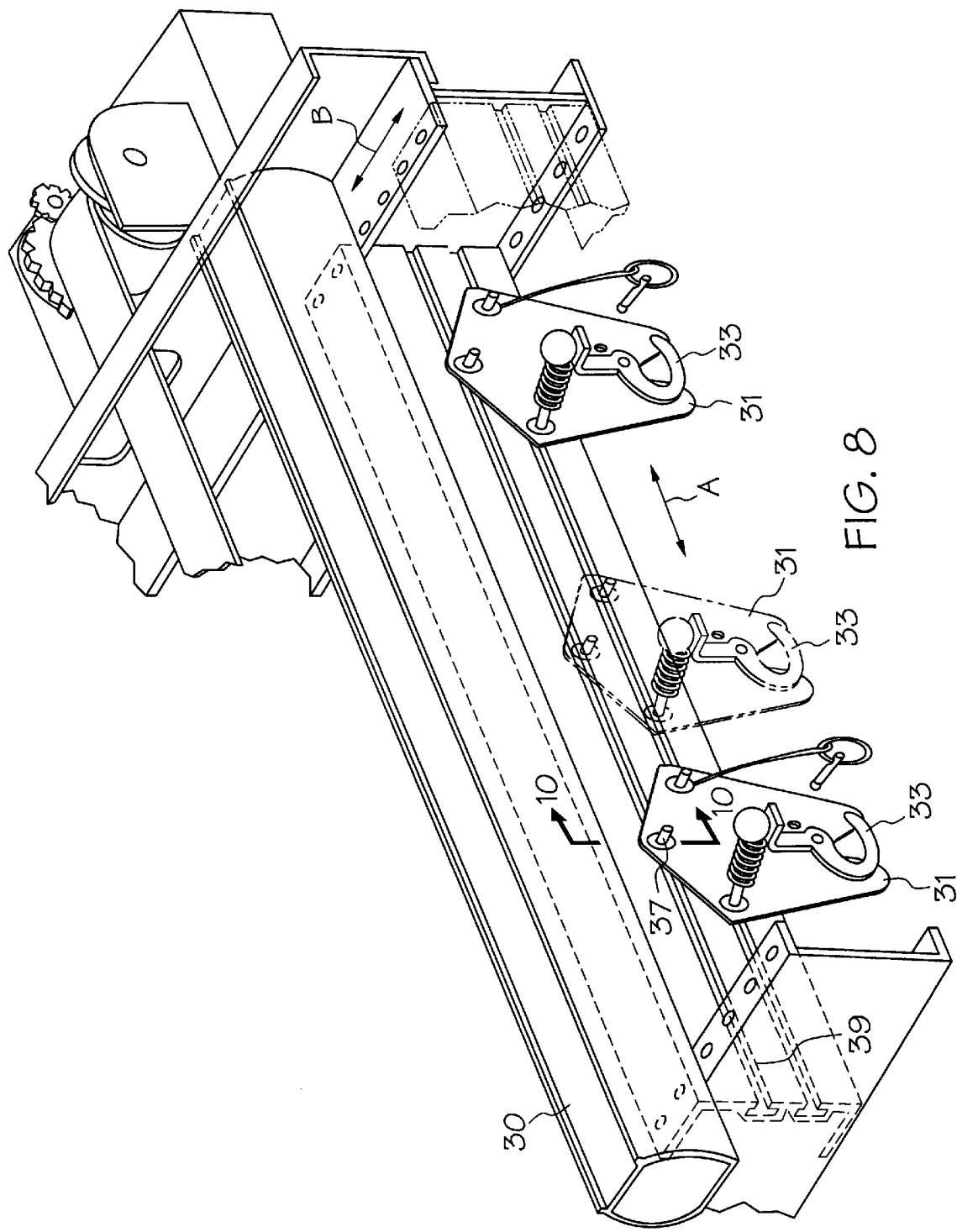

CARGO LOADER

CROSS-REFERENCE TO RELATED APPLICATION

This application claims the benefit of U.S. Provisional Application No. 60/033,385, filed Dec. 16, 1996, the disclosure of which is incorporated by reference.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention concerns vehicles. More particularly, it concerns the loading of cargo into vehicles and devices therefor. Even more particularly, the present invention concerns stowable cargo loading devices for van-type passenger vehicles.

2. Prior Art

By way of background, and as is known to those skilled in the art to which the present invention pertains, the cargo bay area of "vans", "mini-vans", and similar type passenger vehicles is elevated above the ground such that the loading of both heavy and large items is not only awkward, but virtually impossible by one of average or below average strength.

To date, no devices have been proposed to alleviate the situation. Sanchez, U.S. Pat. No. 2,188,374, teaches a cargo-loading device that has a ramp, a cart, and a winch. The winch pulls the cart up the ramp onto a vehicle. However, the ramp must be manually assembled before, and disassembled after, each use, rendering the device not very usable. Dinverno, U.S. Pat. No. 5,183,372, teaches a ramp, a cart, and a winch. The winch pulls the cart up the frame onto a vehicle. However, the ramp is permanently attached to the vehicle; thus, the cargo bay area of the vehicle can be used only to transport carts. Brown, U.S. Pat. No. 5,553,762, teaches a ramp to be attached to the tops of the sides of the back of a pickup truck, leaving the bed of the pickup truck free to carry other cargo. Heine, U.S. Pat. No. 5,556,249, teaches a ramp with an attached sled, the ramp to be attached to the bed of a pickup truck or the like. However, none of these references provides a stowable cargo loader with separate ramp and cart elements in which the ramp is collapsible and removably attaches to the inside of a van-like vehicle.

As detailed hereinbelow, the present invention provides a stowable cargo loading device that overcomes this problem.

BRIEF SUMMARY OF THE INVENTION

In accordance herewith, there is provided a device for loading cargo in the cargo bay area of a vehicle, the device, generally, comprising:

(a) a frame member, the frame member including at least two sections, the frame member defining a pathway for loading a cargo-bearing cart into the cargo bay area of a vehicle, at least one section of the frame member being a ground-engaging section;

(b) a hinge for rotatably interconnecting the at least two sections;

(c) means for anchoring the device within the cargo bay area of a vehicle;

(d) a cargo holder slidably movable on the pathway;

(e) a winch for drawing the cargo holder on the pathway, the winch including a pullable member, the pullable member being attachable to the cargo holder; and wherein upon operation of the winch, the cargo holder travels the pathway to elevate cargo borne by the cargo holder into the cargo bay area of a vehicle.

The frame member is disposed partially in the cargo bay area of the vehicle and extends outside the vehicle therefrom. The frame is anchored inside the vehicle by removably attaching to the anchor rods in the floor of the vehicle that normally hold the rear and/or middle seats in place. The frame defines a pathway on which the cart can travel, when pulled by the winch. The frame comprises at least two, and preferably a plurality of, sections, the multiple sections being collapsible and stowable in the vehicle.

For a more complete understanding of the present invention, reference is made to the following detailed description and accompanying drawings. In the drawings, like reference characters refer to like parts through the several views, in which:

BRIEF DESCRIPTION OF THE SEVERAL VIEWS OF THE DRAWING

FIG. 2 is a perspective view of a cart for use with the cargo loader of the invention, showing the collapsibility thereof in phantom;

FIG. 3 is a further perspective view of the cart hereof for use with the cargo loader of the invention, showing the extensibility of the cart;

FIG. 8 is a perspective view, partly in phantom, of the latch mechanism hereof;

DETAILED DESCRIPTION OF THE INVENTION

Figure 1:
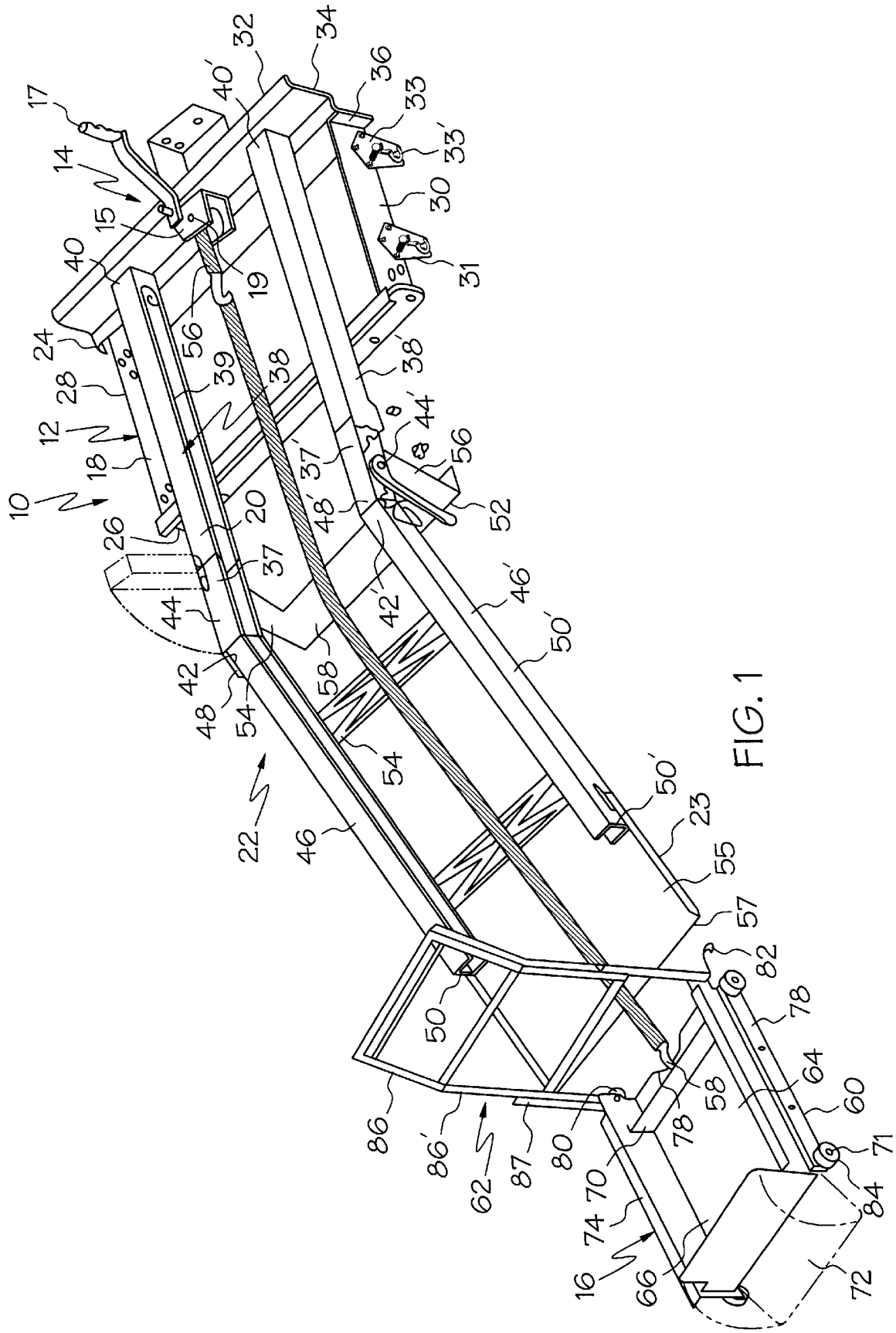
FIG. 1 is a perspective view of a first embodiment of a cargo loader in accordance with the present invention.

With reference to FIGS. 1–4, there is depicted therein a first embodiment of a cargo loader or loading device in accordance herewith and, generally, denoted at 10. The device 10 is particularly for use with a van-type vehicle 110. The device 10, generally, includes a frame or frame member 12, a winch 14, and a cargo holder 16. The frame or frame member 12 comprises at least two sections or portions and, preferably, comprises a first portion 18, a second portion 20, a third portion 22, and a fourth portion 23.

The first portion 18 defines a brace for the device 10 and includes a first, a second, a third, and a fourth plate or wall 24, 26, 28, 30, respectively. The plates are fashioned of any suitable metal, such as steel or aluminum; a hard plastic material; a composite material; or a similar well-known material characterized by both light weight and high strength. The first, second, third, and fourth walls 24, 26, 28, 30 are disposed in the form of a rectangle, the first plate 24 being opposite the second plate 26 and the third plate 28 being opposite the fourth plate 30, and fastened to each other by bolts or other well-known fastening members or welding or the like. The first wall 24 includes a support plate 32 integrally formed therewith and which comprises a top portion 34 and a bottom portion 36. The support plate 32, where employed, is used to mount the winch 14 thereonto. The winch 14 is secured to the support wall 32 by welding or the like, as shown. Alternatively, as discussed hereinbelow, the winch 14 may be positioned at a site remote from the frame 12, or in another position or location on the frame 12, to enable full usage of the device 10.

Figure 10:
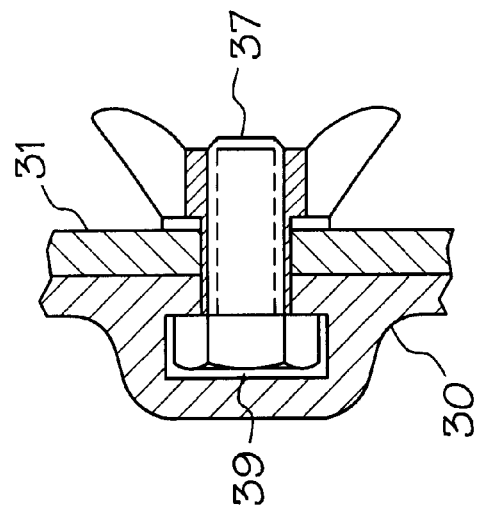
FIG. 10 is a cross-sectional view taken along line 10—10 of FIG. 8.
Figure 9:
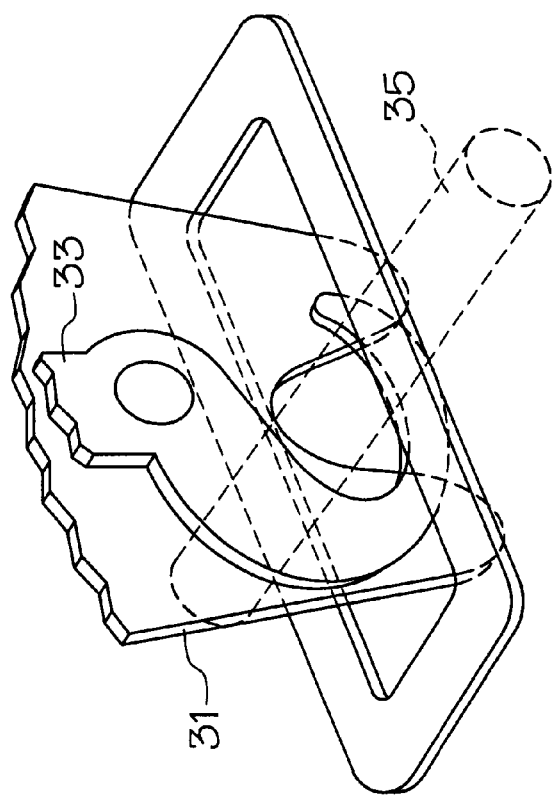
FIG. 9 is an enlarged view, partly in phantom, of the latch mechanism hereof attached to a seat anchor of a vehicle.

As shown in FIGS. 8–10, the third and fourth plates 28, 30 each have at least one latch 31 affixed thereto. The latches define means for anchoring the device 10 within the cargo bay area of a vehicle. Each latch 31, generally, comprises a catch 33, which may be biasedly moved, such as by a spring or the like, into engagement with a suitable hooking device to enable the catch 33 to surround same. The biasing is ordinarily achieved by a spring or the like (not shown). A lever or handle 33' may move the catch 33 into and out of engagement when not biased. Alternatively, the lever 33' may be used to operate against the bias to release the catch 33 from the hooking device, when desired. The latches 33 as shown in FIG. 1, per se, are well known to the skilled artisan. Herein, each latch 31 at least partially surrounds a floor anchor or rod 35 provided in the vehicle below the floorboard and locks thereonto by enveloping same to secure the frame member to the vehicle.

As shown in FIG. 8, the latches 31 are slidably adjustable along the plates 28, 30 in the direction of arrow A, by bolts 37 or similar devices sliding in grooves 39 in the plates 28, 30, to enable attachment to floor anchors 35 that are closer to or farther apart from each other, to enhance usability of the device with vehicles of different sizes. Once positioned appropriately to attach to the floor anchors 35, the bolts 37 are held in place by fastening wing nuts 41 thereto, as shown in FIG. 10. The floor anchors 35 are standard installations in the type of vehicle under consideration herein, and are used to removably mount the middle and rear rows of seating in the vehicle. Thus, the present device requires no alteration of the vehicle.

Further, the plates 28 and 30 can be moved in the directions of arrow B in FIG. 8 to accommodate use with different sizes of vehicles. This movement of the plates 28 and 30 is accomplished by unbolting or otherwise detaching the plates 28 and 30 from the plates 24 and 26; manually moving the plates 28 and 30 in the directions of arrow B as appropriate; and re-bolting or otherwise re-attaching the plates 28 and 30 to the plates 24 and 26.

The second portion 20 of the frame 12 surmounts the first portion 18, and comprises first and second spaced apart opposed channel members 38, 38'. Each channel member 38, 38' has a first end 40, 40' and a second end 42, 42', respectively, disposed such that the first end 40, 40' is secured, such as by wending or the like, to the first wall 24 of the first portion 18 of the frame 12. Each channel member 38, 38' has a channel formed therein, only one of which is shown at 39. The channels 39, 39' are disposed in opposition to each other. As detailed below, the channels 39, 39' each define a portion of a track or pathway in which the cargo holder or cart 16 moves. Each channel member 38, 38' includes a channel extension 37, 37', respectively, hingedly interconnected to their associated members 38, 38', as shown. The first and second members 38, 38' of the second portion 20 are each provided with an aperture 44, 44', respectively, proximate the second end 42, 42' thereof, to which a support leg or stanchion 52 is swivelably attached. The support leg 52 is, preferably, U-shaped, comprising two opposed arms 54, 55 and a longer medial bight member 58, having a width substantially equal to the width of the first wall 24 of the first portion 18 of the frame 12. Each of the opposed arms 54, 55 is hingedly attached via a pivot pin (not shown) mounted to the channel members 38, 38' via the apertures 44, 44'. The pivot pin enables the support leg or stanchion 52 to swing in a direction toward and away from the first portion 18 of the frame 12 below the second portion 20. The bight member 58 engages the vehicle floor and rests thereupon. Alternatively, the stanchion 52 may be fixedly secured to the device 10 via welding, threaded fasteners, or the like.

The third portion 22 of the frame 12 comprises first and second spaced apart opposed channel members 46, 46', each having a first end 48, 48' and a second end 50, 50', disposed such that the first end 48, 48' of each channel member 46, 46' registers with an associated end of an extension 37 or 37' of the second portion 20 and is hingedly attached thereto, as shown. In use, the channel members 46, 46' extend from the cargo bay end of the vehicle.

The third portion 22 further comprises at least one crossmember 54 disposed between the first and second channel members 46, 46' for structural reinforcement and to maintain the spacing between the channel members.

The fourth portion 23 of the frame 12 comprises a ramp 55. The ramp 55 is detachably secured to the third portion 22 of the frame 12 proximate the free end thereof, i.e. the end opposite the second portion 20, by any suitable means (not shown), such as, for example, a removable cotter pin, a threaded fastener, or the like. In use, the ramp 55 enables the cargo holder 16 to be directed into the track or pathway defined by the channel members 46, 46' of the third portion 22 of the frame 12 and the channel members 38, 38' of the second portion 20 of the frame 12.

As shown in FIG. 1, the winch 14 includes a bracket 15. A spindle 19 is rotatably secured to the bracket 15 and is attached thereto by any suitable means. Generally, the spindle 19 has its opposed ends disposed in suitable openings formed in the bracket 15 and is retained therein by a bearing or the like (not shown) disposed in each opening. A handle 17 is secured to one end of the spindle 19. A pullable member 56, such as a tape or cable or strap, has one end secured to, and is spooled around, the spindle 19. The construction of such a winch is well-known to the skilled artisan. In the embodiment of FIG. 1, the winch 14 rests upon the first member 24 of the first portion 18 of the frame 12 and is attached to the top portion 34 of the plate 32 of the first portion 18 of the frame 12, such that the pullable member 56 may extend from the winch 14 in a direction opposite the plate 32; across the second portion 20 of the frame 12, parallel to and between the first and second members 38, 38'; across the third portion 22 of the frame 12, parallel to and between the first and second members 46, 46' atop the at least one cross-member 54; across the ramp 55; and, finally, attached to the cargo holder 16 by means for attachment such as a hook 58 or any other well-known means of attachment. As noted, the winch 14 may be positioned otherwise on or remote from the frame 12.

The cargo holder 16, itself, comprises a base 60 and a handle 62. The base 60 provides a floor 64, including a top surface 66 and a bottom surface 68 opposite the top surface. A first wall, a second wall, a third wall, and a fourth wall 70, 72, 74, 76, respectively, are disposed around, attached to, and extend upwardly from the floor 64. The first wall 70 has a hook 58 secured thereto for attachment of the pullable member 56 of the winch 14 to the cart 16.

Each of the first, third, and fourth walls 70, 74, 76 comprises an upstanding plate member or section. The first, third, and fourth walls 70, 74, 76 are fixedly attached to each other by any suitable means, such as bolts or other well-known means for fastening. The second wall 72 is disposed between the third and fourth walls 74, 76 and is hingedly attached to the floor 64, such as by a hinge 73. Suitable removable attachment means such as threaded fasteners or the like (not shown) enable the second wall 72 to be held in upright position via interconnection to its adjacent walls 74 and 76. The hinge 73 enables the second wall 72 to swing in a direction to and away from the third portion 22 of the frame 12 above the floor 64. The second wall 72, thus, defines a ramp for loading cargo onto the cart 16.

A plurality of wheels 84 are attached to the cart 16. Attachment of the wheels is typically achieved via a transverse axle 71 suspended from the third and fourth walls 74, 76 and onto which the wheels 84 are journalled in a manner well-known to the skilled artisan. The wheels 84 enable the cart 16 to be rolled onto the ramp 55.

As shown in FIGS. 1, 2, and 3, the handle 62 of the cargo holder 16 comprises a plurality of members 86, 86', 87. Each member 86 is of any suitable geometric configuration and is, preferably, substantially rectangular in shape and is hingedly attached to the adjacent member 86', with the last member 87 hingedly attached to the first wall 70, or to the third and fourth walls 74, 76 proximate the first wall 70, of the base 60 of the cargo holder 16.

As shown in FIG. 3, the handle section 87 may be placed in a horizontal plane substantially co-planar with the floor 64, thus enabling the cart 16 to easily become a dolly.

Figure 4:
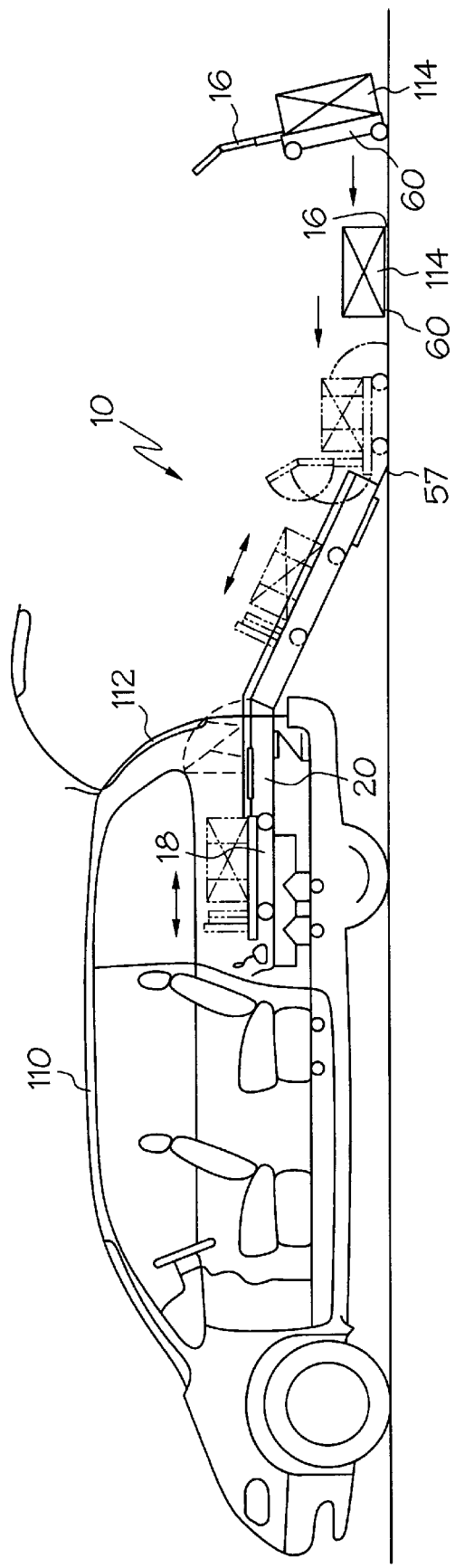
FIG. 4 is a side elevational view of the invention hereof in use.

Turning now to FIGS. 1 and 4, the cargo loader 10 of the present invention is used in the following manner to load cargo into a vehicle: The first portion 18 of the frame 12 is placed interiorly of the vehicle 110, in the cargo bay area thereof. The latches 31 are secured around the floorboard anchor rods of the vehicle 110 after removal of the seating to lock the device 10 in place. The stanchion 52 is placed in its support position. The channel members 38, 38', 46, 46' are assembled together to form the track or pathway such that the second portion 20 extends out the rear doorway 112 of the vehicle 110. The ramp 55 is positioned such that it engages the ground.

A load of cargo 114 may then be placed upon the cargo holder 16.

The pullable member 56 of the winch 14 is then attached to the hook 58 of the cargo holder 16. The handle 17 of the winch 14 is then rotated such that the spindle 19 turns and causes the pullable member 56 to spool around the spindle 19. As the pullable member 56 spools around the spindle 19, the cargo holder 16 is pulled in the track across the fourth portion 23 of the frame 12, across the third portion 22 of the frame 12, and finally onto the second portion 20 of the frame 12 and the first portion 18 of the frame 12, on which the second portion 20 rests, by traveling in the track defined by the channel members 38, 38', 46, 46'. Because the first portion 18 of the frame 12 is disposed interiorly of the vehicle 110, the cargo loader 10 is, likewise, disposed interiorly of the vehicle 110. Because the load of cargo 114 is carried by the cargo holder 16, the load of cargo is also now disposed interiorly of the vehicle, completing the loading process. Once inside the vehicle, the cargo bolder 16 and load of cargo 114 are held to the frame by flexible belts or straps (not shown) that a user of the device can fasten around the cargo holder 16 and load of cargo 114.

Because of the bolting interconnection of the frame member sections, they can easily be detached from each other and placed into stowable position.

In sizing the present device, the track defined by the channel members 38, 38', 46, 46' is dimensioned to fit between the wheel wells of the vehicle 110 while the plane defined by the upper edges of the walls of the cargo holder is, preferably, above the wheel wells.

Furthermore, the cargo holder 16 may be used as a cart independently of the other elements of the device 10.

Figure 5:
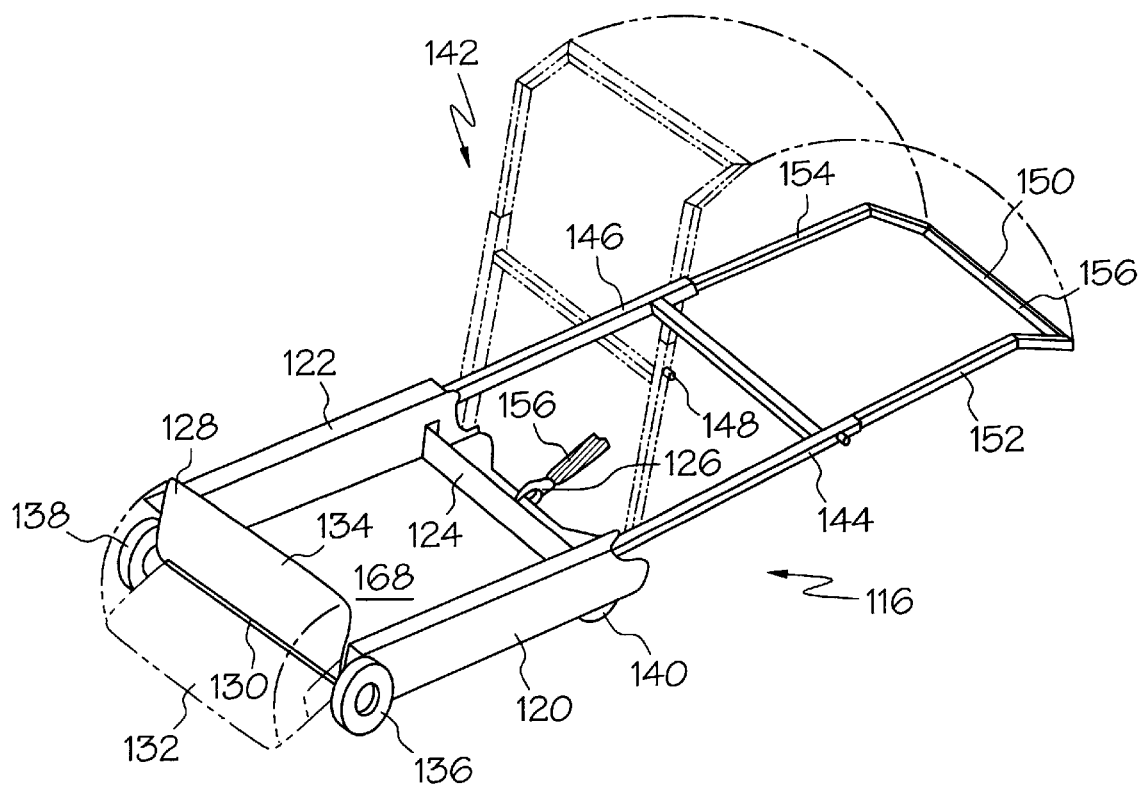
FIG. 5 is a perspective view, partly in phantom, showing a second embodiment of the cart hereof.

Referring now to FIG. 5, there is depicted therein a second embodiment of the cargo holder or cart hereof, generally, denoted at 116. The cargo holder or cart 116 includes a base or bottom wall 118. A pair of spaced apart side walls 120, 122 upwardly extend from the base and are integrally formed therewith. A rear wall 124 is used to secure the pullable member 156 thereto, via a receptor 126 secured thereto by welding or the like. A front wall 128 encloses the cargo holder and forms a substantially rectangular configuration. The front wall 128 is pivotably rotatably mounted to the base 118 by any suitable means, such as a hinge rod 130 or the like. The hinge rod 130 is connected to the base 118 by any suitable well-known bracketry or the like (not shown). The front wall is rotatably mounted to the hinge rod 130 and moves between a first ground-engaging position 132, shown in phantom, and an upward position 134. In the ground-engaging position 132, the front wall 128 defines a ramp. In the upward position 134, the front wall 128 is interconnected to the side walls 120, 122 by any suitable means, such as bolts, threaded fasteners, or the like by projecting the fastener through suitable registering apertures (not shown) formed in the front wall 128 and the side walls 120 and 122.

The hinge rod 130, in accordance herewith, extends laterally outwardly beyond the edges of the base 118, as shown. A pair of opposed enlarged wheels 136, 138 are journalled on opposite ends of the hinge rod 130. In this manner, the hinge rod 130 also functions as an axle for the wheels 136, 138. The wheels 136, 138 are retained in place by any suitable means (not shown), such as a bolt or the like threaded onto the ends of the hinge rod 130.

Spaced apart and traversing the width of the base 116 is a second axle (not shown) and which is suspended therefrom. Interior wheels, only one of which is shown at 140, is carried on the second axle and is secured thereto in a similar fashion as that of the wheels 136, 138.

The cart or cargo holder 116 further includes an extendible handle member, generally, denoted at 142. The handle 142 includes a pair of spaced apart arms 144, 146 that extend outwardly from the base 118. The arms are, preferably, hollow tubular members. Preferably, the arms 144, 146 are pivotably rotatably mounted to the base 118 by any suitable means, such as by a pivot pin (not shown). It is contemplated that when in the upright position 134, the arms 144, 146 will be in proximity to the side walls 120, 122. Thus, by providing suitable apertures in the walls 120, 122 and in the arms 144, 146, a projecting pin 148 can then be inserted therethrough to lock each of the arms 144, 146 when in the upright position 134.

The handle 142 further includes a second member 150. The second member 150, generally, comprises a pair of spaced apart legs 152, 154 and an interconnected grasping portion 155 integrally formed therewith. The legs 152 and 154 are dimensioned less than are the arms 144, 146. By forming the arms 144, 146 from hollow tubular members, and by dimensioning the legs less than the arms, the legs 152, 154 are telescopingly insertable into the interior of the arms 144, 146, as shown. By providing at least one aperture in each of the arms 144, 146 and legs 152, 154, registration therebetween can be achieved. Thereafter, a suitable locking member, such as a pin or the like, can be inserted through the registering apertures to lock the two members together. Upon removal of the pin, if desired, the components of the handle can be separated therefrom. This separability enables much easier stowability.

The cart of FIG. 5 may be used with the loading ramp of FIG. 1 and, similarly, the cart of the first embodiment can be used with the loading ramp of the second embodiment, which is detailed below. Likewise to the first embodiment, the handle 142 of FIG. 5 may be positioned in a substantially horizontal plane substantially co-planar with the bottom wall 118 to render the cart 116 as a dolly, as described hereinabove with respect to the first embodiment.

Figure 6:
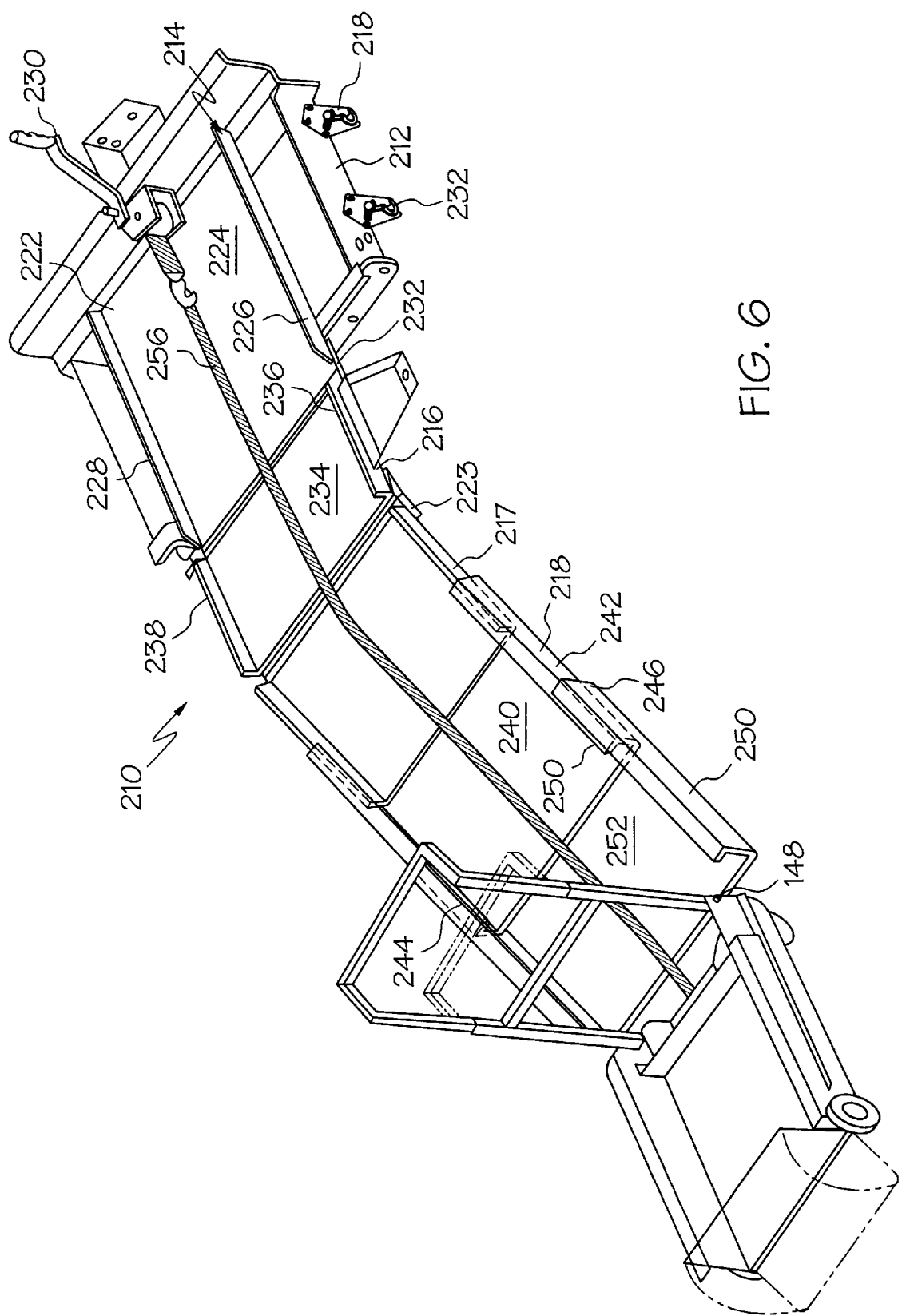
FIG. 6 is a perspective view, partly in phantom, depicting a second embodiment of the cargo loader hereof.

Referring now to FIG. 6, there is depicted therein a second embodiment of the loading device, per se, contemplated for use herein and, generally, denoted at 210. The loading device 210, generally, comprises a brace section or frame member 212 and at least one other section and, preferably, a plurality of interconnecting ramp portions, generally, denoted at 214, 216, 217, and 218. As detailed hereinbelow, it is to be appreciated that the number of ramp portions is not critical hereto and can comprise any number, so long as there is at least one such ramp portion. Likewise, with regard to the first embodiment, the number of channel member sections may be varied.

The frame member 212 is similarly constructed as hereinbefore defined with the respect to the brace 18 and includes latches 220 or interlocking the frame 212 to the floor anchors or rods of the vehicle.

A platform 222 overlies and is secured to the frame 212 by any suitable means, such as by welding, bolting, or the like. The platform 222 comprises a base 224 and a pair of opposed side walls 226, 228, as shown. The side walls define a keeper for preventing lateral movement of the cart 16 or 116 when it is positioned thereon. Thus, the platform 222 defines the first ramp portion 214. As shown in the drawing, a winch 213 is secured to the frame. However, it should be noted, although not shown in the drawing, that the winch can be placed in a different position on the frame or in a position remote from the frame itself, and with suitable guide spools or pulleys (not shown) the pullable member 256 can be wound therearound and extended therefrom. In this manner, a greater area on the platform is provided without interference from the winch.

The section 216 includes a base 234 and a pair of upstanding side walls 236, 238. The section 216 is pivotably interconnected to the platform 222 at the free end thereof via a hinge plate 232 that traverses the width of the platform 222 and the section 216. The hinge plate 232 is of any well-known commercially available construction and includes a pair of plates interconnected by a pivot pin, one plate being secured to the platform and the other plate being secured to the section 216.

The section 216 is pivotably interconnected to the section 217 in similar fashion to the interconnection between the section 216 and the platform 222 via the hinge plate 232.

Figure 7:
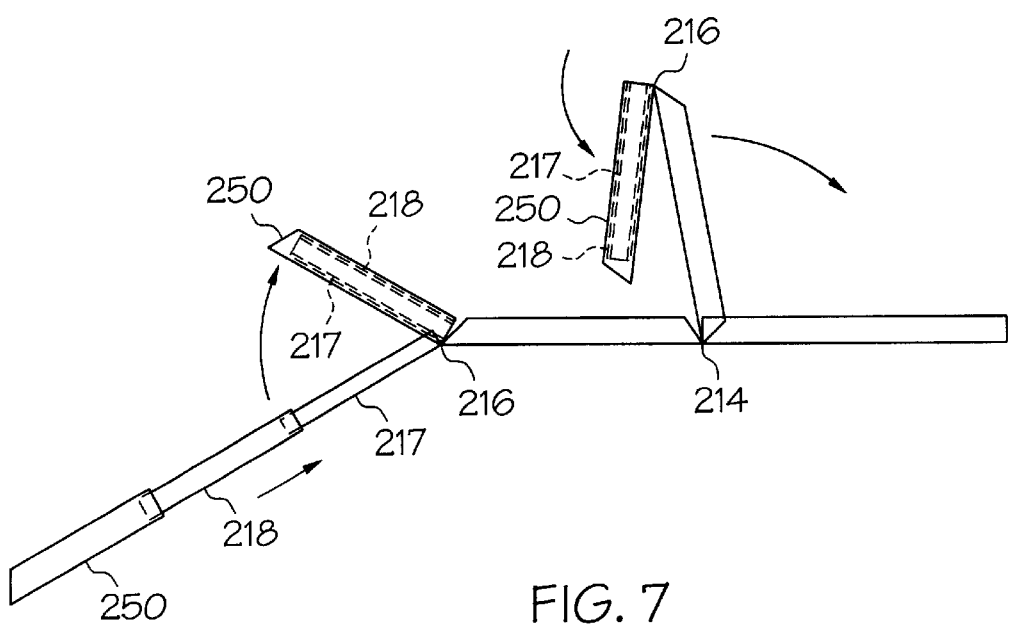
FIG. 7 is a schematic diagram showing the stowability motions for the cargo loader of FIG. 6.

The section 218 is slidably telescopingly interconnected to the section 217. As shown, the section 218 includes a base or bottom wall 240 and a pair of opposed upstanding channel-forming members 242 and 244. Each channel-forming member 242, 244 is similarly constructed and includes an upstanding wall 246, a top wall 248, and a flange 250 downwardly depending from the top wall 248. The top wall 248 overlies the top edges of the side walls of the panel 217. The bottom wall 240 has a width greater than that of the panel 217. In this manner, the section 218 is dimensioned to slide under the panel 217 in a stowable position, as shown in FIG. 7. When in the extended position, gravity will cause and maintain interengagement between the bottom wall of the section 217 and the bottom wall 240 of the section 218.

The embodiment of FIG. 6 further includes a ground-engaging panel or section 250. The section 250 is similarly constructed to the section 218. However, the panel 250 has a bottom wall 252 provided with a width greater than that of the bottom wall 240 of the section 218 so that the section 250 can telescope underneath the section 218 and stow therebelow, as shown in FIG. 7.

It is to be appreciated that, by the interconnection of the sections, there is provided a ramped pathway, in lieu of a track, for moving the cart thereonto. This alleviates the potential problem of binding in the track, etc.

In use, the platform of this embodiment operates in the same manner as that heretofore described with respect to the track. However, it is to be appreciated that, as shown in FIG. 7, this embodiment has greater stowability than does the first embodiment. As shown in FIG. 7, section 250 slides underneath and telescopes under section 218, which, in turn, telescopes and slides beneath section 217. The three telescoped sections then pivot and rotate over section 216, which, in turn, pivots onto the platform to achieve stowability. In the stowed position, and by virtue of the overcenter angle, the cart is retained on the platform in a safe manner as well.

In FIGS. 11–15 there is shown a second embodiment of a winch for use herein and, generally, denoted at 314. The winch 314 is either powered or manually operable at the option of the user, as detailed hereinbelow, though it is contemplated that the winch will be powered in most circumstances and manually operated only in emergency or other unusual situations. The winch 314 has a power generator 315 or a crank 318 in communication therewith, as described hereinbelow. The power generator 315 is, preferably, an electric motor 316; however, it is also contemplated that the power generator could be a pneumatic or hydraulic power generator.

The electric motor 316 provides power to the winch 314 via a transmission 326, a drive shaft 328 in communication with the transmission 326, and an adaptor 330 in communication with the drive shaft 328, all in the well-known manner. The motor 316, transmission 326, drive shaft 328, and adaptor 330 are all housed in a housing 334. The adaptor 330 fits onto a crank shaft 332 on the winch 314 and provides rotational power thereto, thus powering rotation of the winch 314. Power is provided to the motor 316 by a power cord 320, which is attached at its other end to a source of electric power, such as a battery or the cigarette lighter of the vehicle (not shown). A switch (not shown) is wired into the power cord 320 such that a user of the present device can operate the winch remotely.

Figure 11:
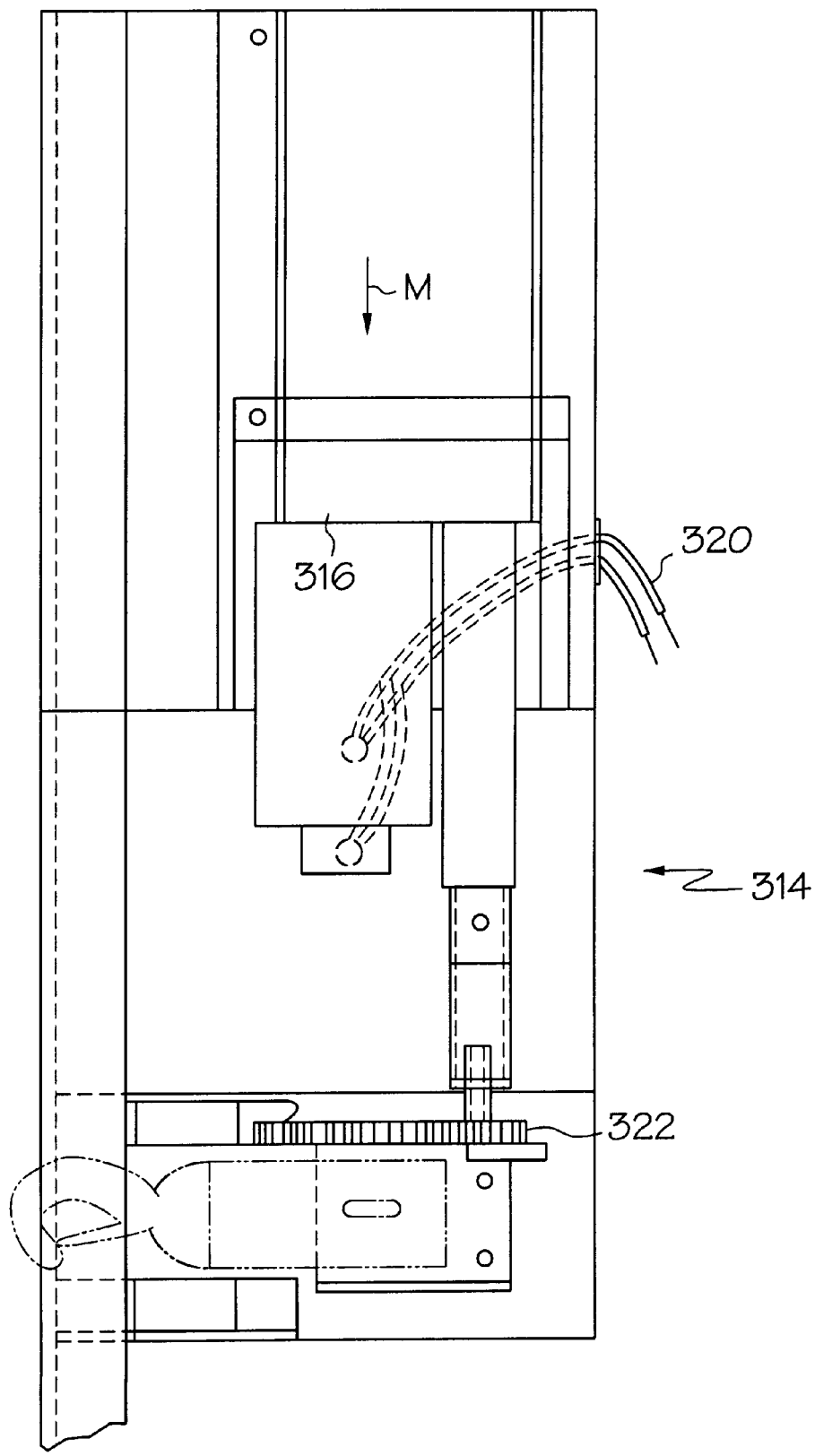
FIG. 11 is a top view of a winch for use with the present invention, showing the winch in communication with a motor via a drive shaft.
Figure 12:
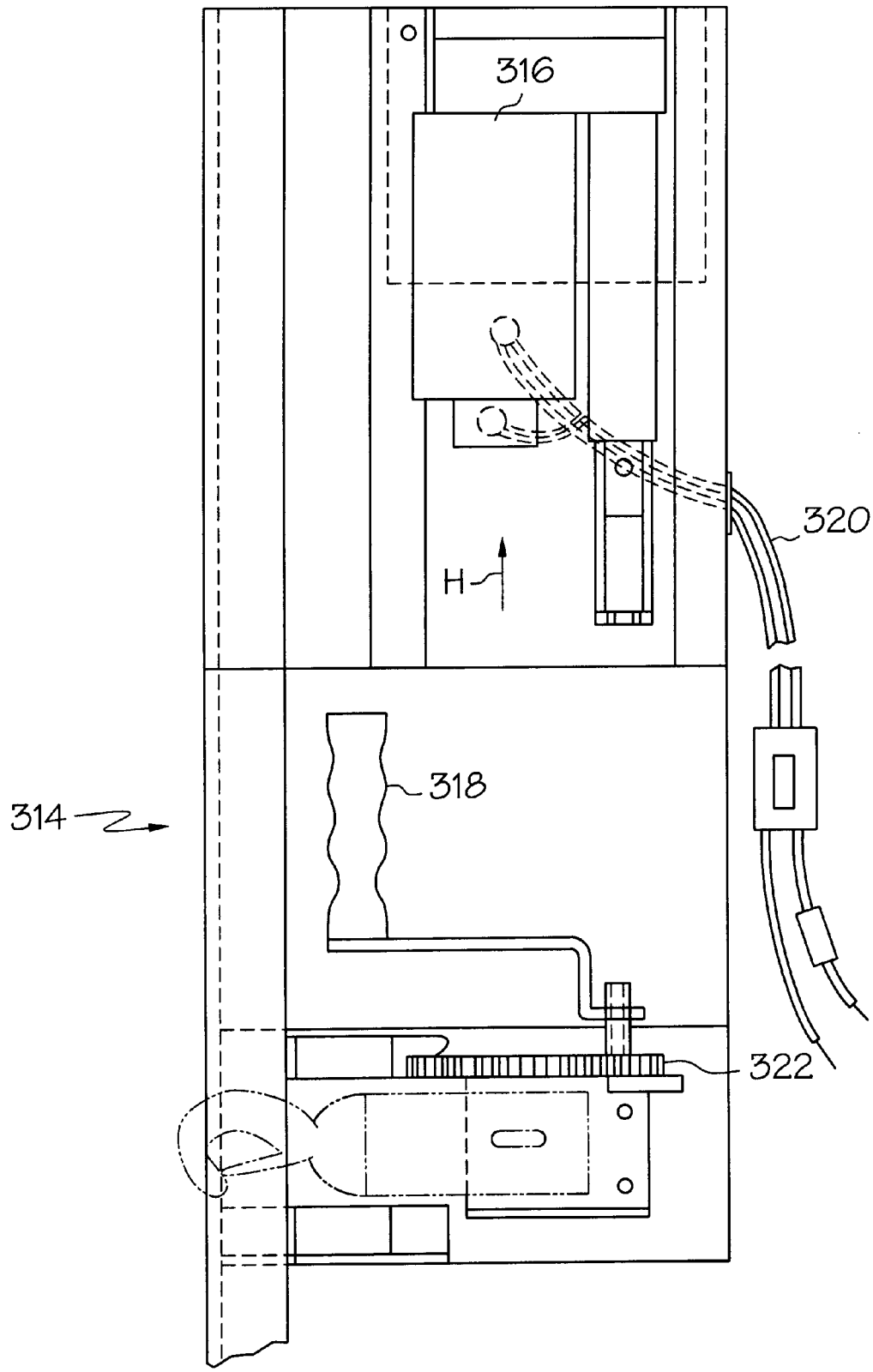
FIG. 12 is a top view of the winch of FIG. 11, showing the winch out of communication with the motor.
Figure 14:
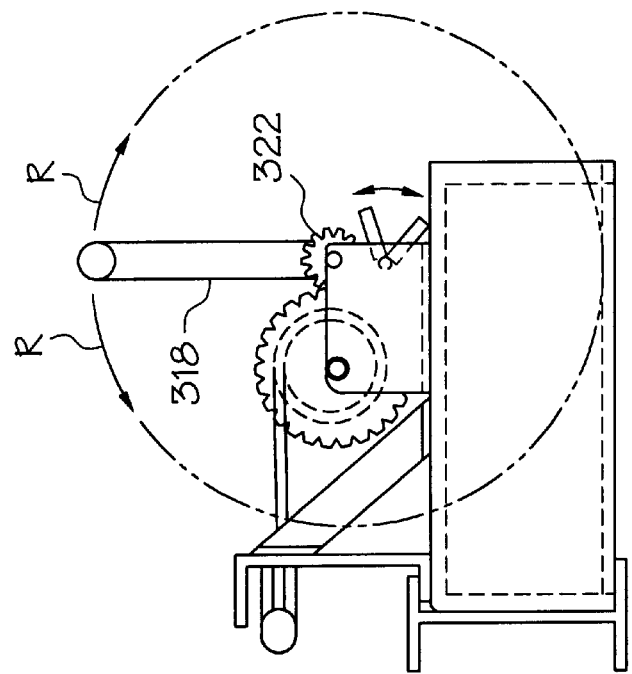
FIG. 14 is a side view of the winch of FIG. 12.
Figure 13:
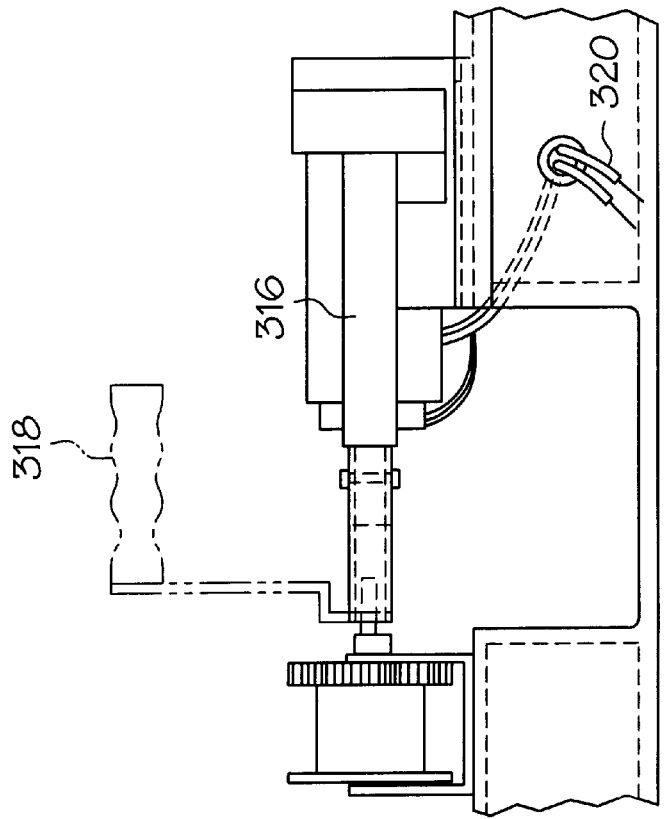
FIG. 13 is a front view of the winch of FIG. 11.
Figure 15:
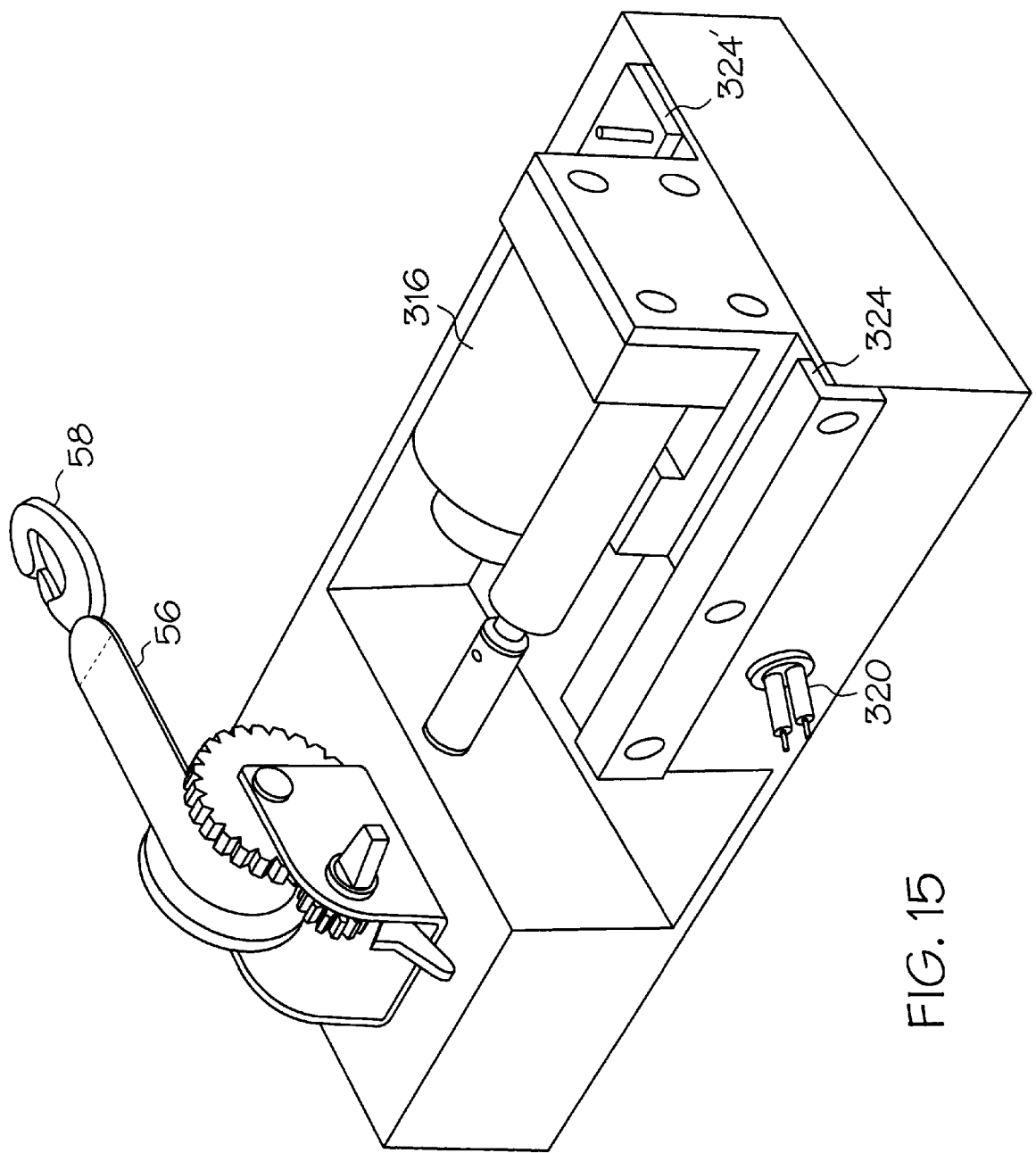
FIG. 15 is a perspective view of the winch and motor of FIG. 11.

As shown in FIGS. 11 and 12, the motor 316 is slidable into and out of communication with the winch 314 in the direction of arrows M and H. FIG. 15 shows a track defined by track sections 324, 324' in which the motor 316 slides. Once in a desired position, whether in communication with the winch 314 or not, the motor 316 is held in position by any convenient means of attachment, such as a hook latch, threaded fasteners, bolts, or the like. FIG. 11 shows the motor 316 positioned in the direction of arrow M, where the adaptor 330 attached to the motor 316 is in communication with the crank shaft 332 on the winch 314 and provides power thereto as described hereinabove. FIG. 12 shows the motor 316 slid in the direction of arrow H, where the adaptor 330 is not in communication with the crank shaft 332; in this configuration, power is provided to the crank shaft 332 manually by frictionally engaging the crank shaft 332 with the crank 318 and turning the crank 318 in the direction of arrows R, as shown in FIG. 14. The motor 316, when engaged, and the crank 318, when engaged, both provide power to the winch 314 via a gear 322. When not in use, the crank 318 is detached from the crank shaft 332 and stored separately in any convenient manner.

Figure 18:
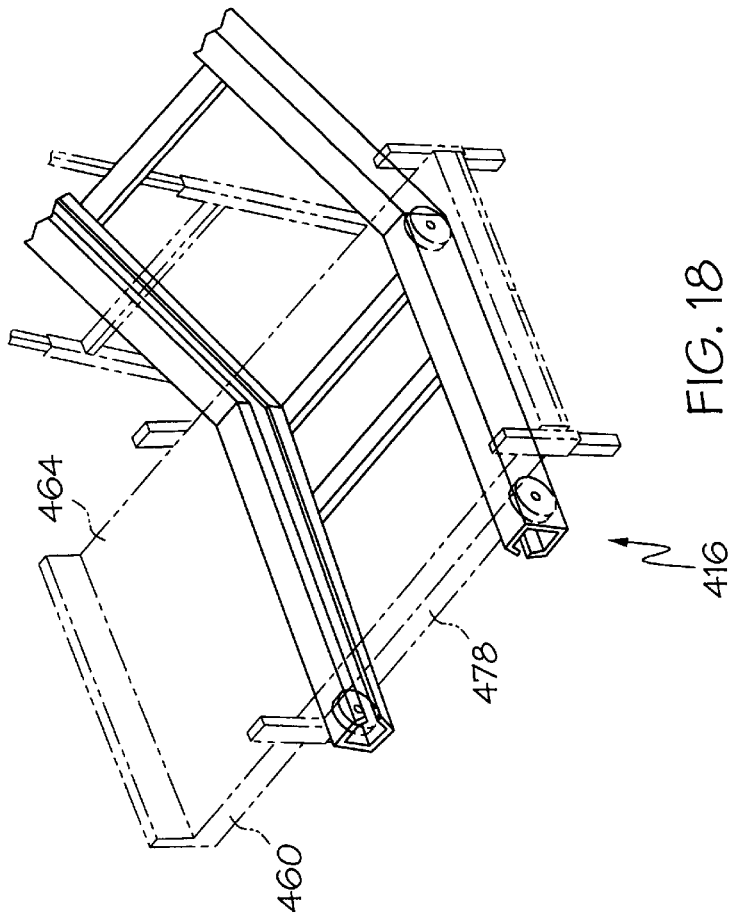
FIG. 18 is a perspective view, partly in phantom, of the third embodiment of the cart hereof.
Figure 19:
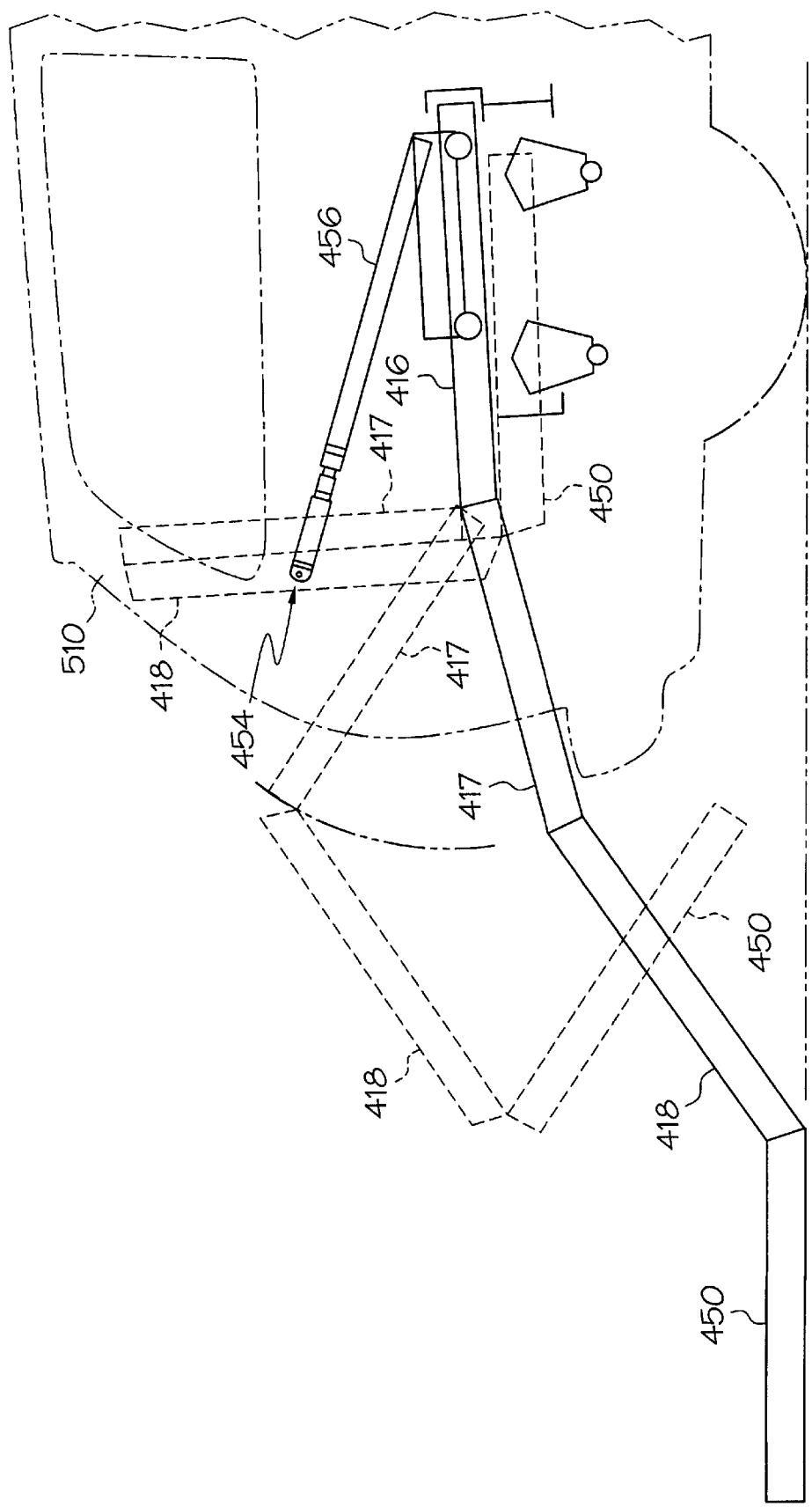
FIG. 19 is a side view of an end of the platform of the third embodiment hereof.

In FIGS. 16–19 there is shown a third embodiment of the cargo loader hereof, denoted, generally, at 410. As shown, the cargo holder or cart 416 comprises a base 460 and a handle 462 attached thereto. The base comprises a floor 464 and walls 470, 472, 474, 476 attached thereto and projecting upwardly therefrom, as in the first embodiment, and further comprises a platform 478 and an extensible ramp 480. The platform 478 is "U"-shaped in cross-section, as shown in FIG. 19, having an upper wall 478' and a lower spaced apart wall 478", the gap therebetween defining a pocket 482. One of the long sides of the "U" is disposed atop the tops of the walls 470, 472, 474, 476 and attached thereto. The open end of the "U"-shaped platform 478 therefore defines an open end of the pocket 482 within the platform 478.

Figure 17:
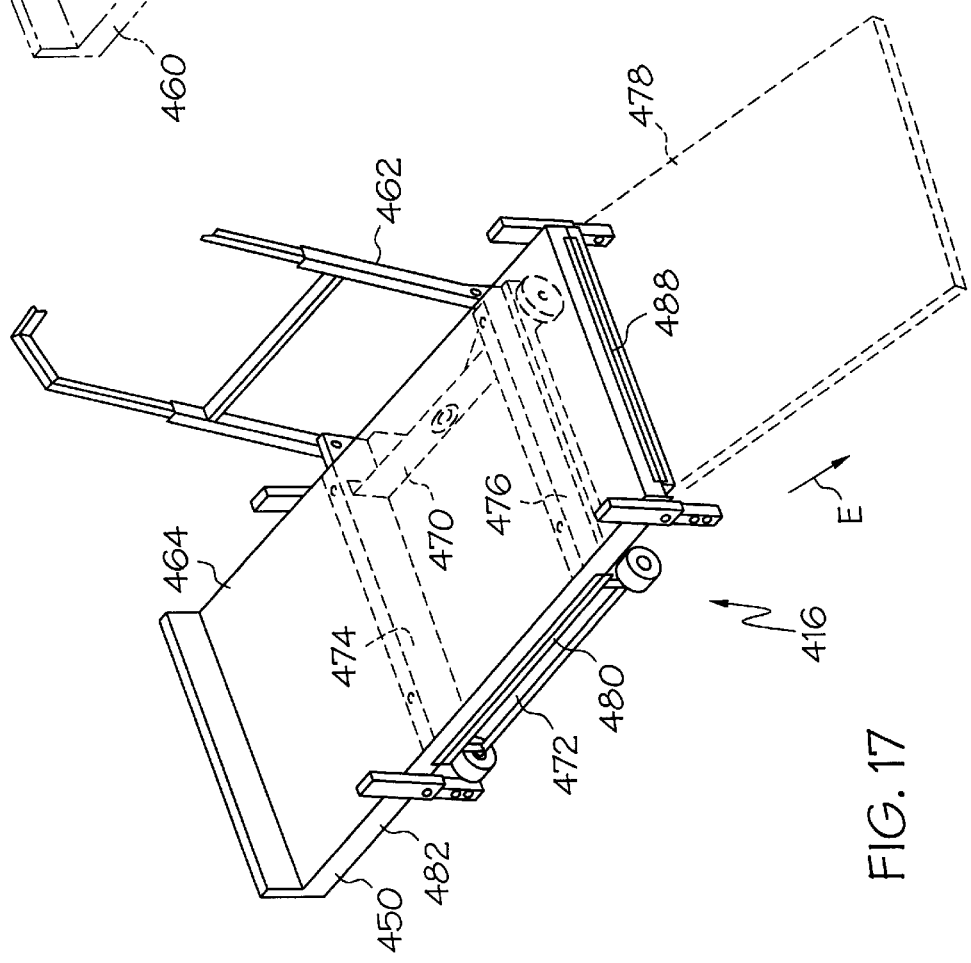
FIG. 17 is a perspective view, partly in phantom, of a third embodiment of the cart hereof.

The extensible ramp 480 can be stored entirely within the pocket 482 of the platform 478, as shown in FIGS. 18 and 19, or hingedly attached to an edge of the platform 478 and extended therefrom in the direction of arrows E or F, as shown in FIG. 17 and as described hereinbelow. The extensible ramp 478 can be hingedly attached to the platform 478 at either of two adjacent edges 484 and 486 via hinges 488 and 490, respectively, to enable latitudinal or longitudinal loading of the cart 416. The hinged attachment of the extensible ramp 480 enables limited vertical movement of the extensible ramp 480 to a horizontal plane to enhance ease of loading the cart 416, for instance when a curb is present.

Figure 16:
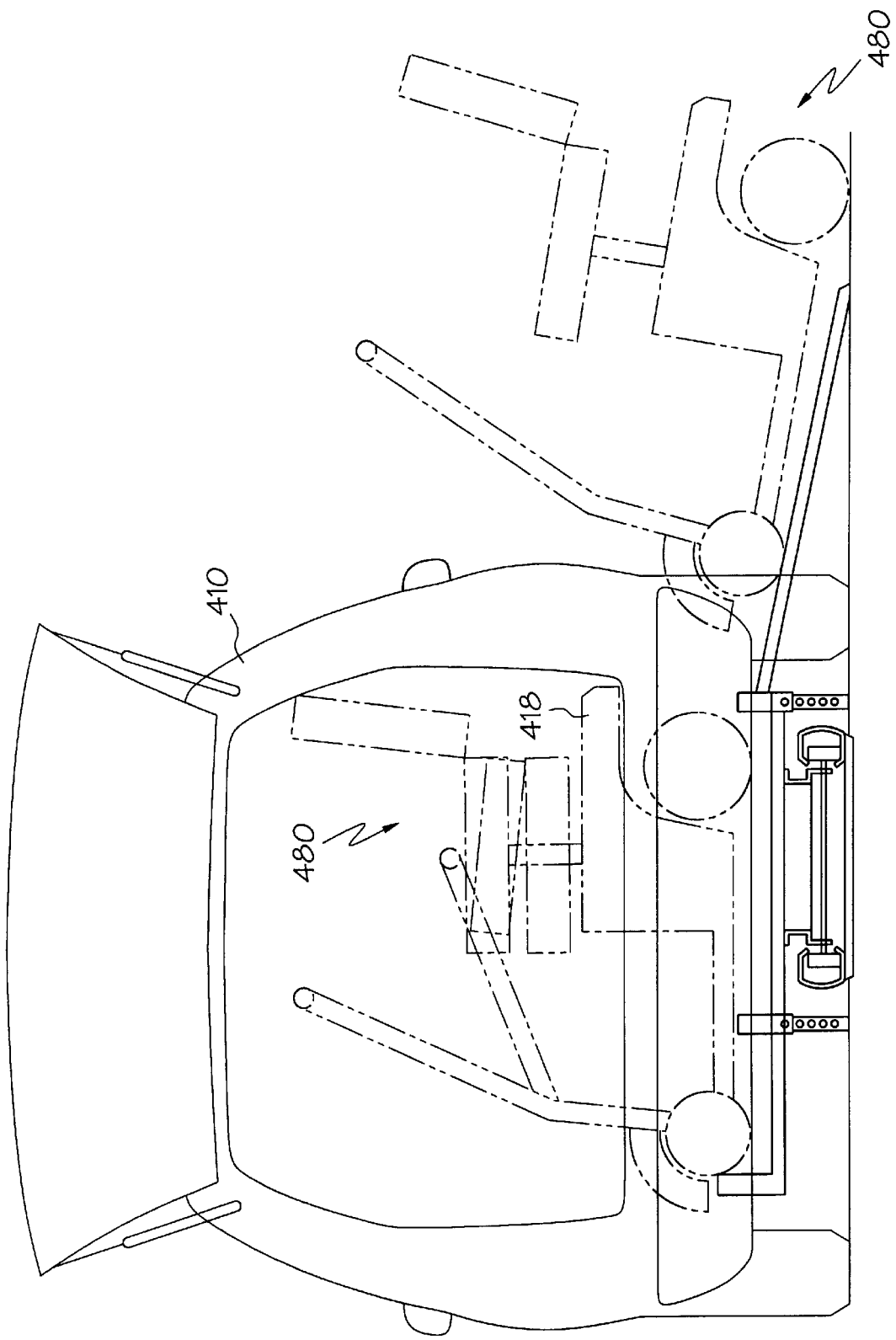
FIG. 16 is an environmental view of a third embodiment of the cargo loader hereof in use.

It is contemplated that this third embodiment of the cart will be used by disabled persons. Such disabled persons often use motorized personal vehicles, such as that depicted at 492, wheelchairs, or similar wheeled devices. Such a wheeled device can be driven or propelled onto the platform 478 of the cart 416 via the extensible ramp 480 in its extended position (FIG. 17); the extensible ramp 480 can then be detached from and stored within the platform 478 (FIGS. 18 and 19); the cart 416 and the wheeled device thereon can be pulled into a van-like vehicle 510 via the winch as described hereinabove; and both the cart 416 and the wheeled device thereon can be easily stowed in the van-like vehicle 510. This use of the cart 416 is depicted in FIG. 16, which shows the cart 416 and a motorized personal vehicle 492 thereon both before and after the motorized personal vehicle 492 is loaded onto the cart 416. The cart is held to the frame by flexible members, such as belts or straps, one of which is depicted at 500 in FIG. 19 anchored to an anchor 454 on section 418 of the frame. FIG. 19 also shows the motions imparted to the various sections of the frame to enable collapsibility and stowability of the present embodiment of the cargo loader hereof It is, thus, readily perceived by the skilled artisan that the present invention provides an easily implemented cargo loading device that takes maximum advantage of the cargo bay area of mini-vans and similar vehicles.

It should be noted with respect hereto that, since the rods to which the frame is latched are the very rods to which the rear seat and/or middle seat of the vehicle is attached, by simply removing the seat(s), the loading device is readily installed in the vehicle in a rapid and easy fashion. Moreover, by fabricating the device from aluminum or other lightweight, high-strength material, virtually any adult can use the device, in fact, the weight of the device is, preferably, less than that of a conventional vehicular seat that is removed upon installation of the present device. Moreover, by removing the middle seat of the vehicle, the cart may be stowed in its dolly formation.

Likewise, by using a winch remote from the frame and by removing the intermediate seating, the cargo loader can be maintained on the device even when configured as a dolly.

While the invention has been illustrated and described in detail in the drawings and the foregoing description, the same is to be considered as illustrative and not restrictive in character, it being understood that only the preferred embodiment has been shown and described fully and that all changes and modifications that come within the spirit of the invention are desired to be protected.

Having, thus, described the invention, what is claimed is:

1. A device for loading cargo in the cargo bay area of a vehicle, the device comprising:
   (a) a cargo holder, the cargo holder having a base and an extensible ramp attached to the base;
   (b) a frame member, the frame member including at least two sections, the frame member defining a path way for loading the cargo holder into the cargo bay of a vehicle, at least one section of the frame member being a ground-engaging section;
   (c) a hinge for rotatably interconnecting at least two sections;
   (d) means for anchoring the device within the cargo bay area of the vehicle;
   (e) the cargo holder being slidably moveable long the pathway;
   (f) a winch for drawing the cargo holder along the pathway, the winch including a pullable member, the pullable member being attachable to the cargo holder; and
   wherein upon operation of the winch, the cargo holder travels the pathway to elevate cargo borne by the cargo holder into the cargo bay of the vehicle.

2. The device of claim 1 wherein the means for anchoring comprises at least a pair of latches, each of the latches adapted to removably attach to an associated floor anchor within a vehicle.

3. The device of claim 2 wherein the at least a pair of latches are adapted to be slidably adjustable.

4. The device of claim 1 wherein at least one of the at least two sections of the frame member comprises an opposed spaced apart pair of channel members.

5. The device of claim 1 wherein one of the at least two sections of the frame member comprises a platform.

6. The device of claim 1 wherein the at least two sections of the frame member are telescopable with relation to each other.

7. The device of claim 1 further comprising:
a stanchion disposed under one of the at least two sections of the frame member and pivotably attached thereto.

8. The device of claim 1 wherein the cargo holder further comprises a handle, the handle being attached to the base, and a plurality of walls surrounding and attached to the base.

9. The device of claim 8 further comprising a plurality of wheels, the wheels being operatively attached to the base.

10. The device of claim 8 wherein the handle of the cargo holder comprises a plurality of sections, each section hingedly attached to an adjacent section.

11. The device of claim 10 wherein the plurality of sections of the handle of the cargo holder are telescopable with relation to each other.

12. The device of claim 8 wherein the handle comprises a plurality of sections, the plurality of sections being separable from each other.

13. The device of claim 8 wherein at least one of the plurality of walls of the cargo holder is hingedly attached to the base, the hingedly attached wall forming the ramp.

14. The device of claim 1 wherein the winch is attached to the frame member.

* * * * *